United States Patent [19]
Barnard et al.

[11] 3,850,542
[45] Nov. 26, 1974

[54] TREATMENT OF CHLORINE-CONTAMINATED SULFURYL FLUORIDE WITH UNSATURATED COMPOUNDS

[75] Inventors: Robert D. Barnard, Walnut Creek; Robert H. Meyer, Concord, both of Calif.

[73] Assignee: The Dow Chemical Company, Midland, Mich.

[22] Filed: Mar. 12, 1973

[21] Appl. No.: 340,525

[52] U.S. Cl................... 423/468, 423/512, 423/579
[51] Int. Cl............................................. C01b 17/45
[58] Field of Search..................... 423/468, 579, 512

[56] References Cited
UNITED STATES PATENTS

| | | | |
|---|---|---|---|
| 2,772,144 | 11/1956 | Belf.................................... | 423/468 |
| 3,092,458 | 6/1963 | Ruh et al............................ | 423/468 |
| 3,403,144 | 9/1968 | Lam et al........................... | 423/468 |

FOREIGN PATENTS OR APPLICATIONS

| | | | |
|---|---|---|---|
| 1,017,323 | 1/1966 | Great Britain..................... | 423/468 |

Primary Examiner—Edward Stern
Attorney, Agent, or Firm—J. Roger Lochhead

[57] ABSTRACT

Sulfuryl fluoride prepared by reaction of sulfur dioxide, chlorine and hydrogen fluoride may contain sufficient amounts of chlorine to be excessively corrosive when employed as a fumigant in humid areas. It has been found that said chlorine can be converted to an innocuous or readily separated material by reaction with certain compounds containing carbon-to-carbon double or triple bonds.

5 Claims, No Drawings

TREATMENT OF CHLORINE-CONTAMINATED SULFURYL FLUORIDE WITH UNSATURATED COMPOUNDS

BACKGROUND OF THE INVENTION

Sulfuryl fluoride is a space fumigant of considerable commercial importance. An established process of manufacturing it comprises the reaction of sulfur dioxide, chlorine and hydrogen fluoride at elevated temperatures in the presence of activated charcoal. Processes of this type are the subject of U.S. Pat. Nos. 3,092,458 and 3,320,030. The inclusion of significant amounts of chlorine in the produced sulfuryl fluoride is not intended but may occasionally occur. Complete removal of chlorine by conventional methods of separation is inherently difficult and requires very close process control. If the presence of chlorine in detrimental amounts is not detected until after the fumigant is supplied in cylinders for field use, the problem becomes particularly acute and annoying.

It is then apparent that there is a need for a flexible method of removing or converting chlorine contaminant in sulfuryl fluoride. It is a principal object of the present invention to provide such a method. A particular object is to provide a simple method of salvaging chlorine contaminated cylinders of sulfuryl fluoride for fumigant use in humid climates.

SUMMARY DESCRIPTION

The invention is a method for converting molecular chlorine contained in sulfuryl fluoride to innocuous or readily separable chlorine compounds. This method comprises contacting chlorine-contaminated sulfuryl fluoride with one or more unsaturated compounds having at least one carbon-to-carbon double or triple bond which is not hindered or deactivated to chlorine adduction by the effects of other moieties within the compound. The unsaturate is employed in an amount such as to provide at least one reactive multiple bond per molecule of chlorine to be converted. Contact is generally continued until at least a substantial proportion of the molecular chlorine has been converted.

In order of increasing preference, solid, liquid or gaseous unsaturates may be employed. The unsaturate and the sulfuryl fluoride may be contacted as separate phases or as components of a single phase and in any convenient manner.

Temperature and pressure are important factors only to the extent of being essential to keeping either reactant in a desired state or phase.

If the products of the reaction(s) between the chlorine and the unsaturated compound(s) have no properties detrimental to the contemplated end-use of the sulfuryl fluoride, further processing is unnecessary. Otherwise, their separation is readily accomplished by conventional procedures.

DETAILED DESCRIPTION

Suitable Unsaturates

Suitable unsaturated compounds for the practice of the present invention are unsaturated compounds having at least one carbon-to-carbon multiple bond which is not sterically hindered by the bulk or position of adjacent groups and is not deactivated by the effects of electron withdrawing moieties within the molecule.

The suitability of any candidate unsaturate is easily determined by a simple empirical test, such as that described in Example 2, herein. However, it has been found that as a general rule, considerable deactivation of carbon-to-carbon multiple bonds to chlorine adduction results when such a bond is alpha, beta- to a carboxyl group or to one or more functional groups which exert a net effect equivalent to that of a single electron withdrawing group having a dipole moment in excess of about 1.8 Debye units. For example, crotonic acid (C—C=C—COOH) is soluble in liquid sulfuryl fluoride but does not detectably take up chlorine in 60 minutes of contact at ordinary temperatures. In contrast, oleic acid ($C_8H_{17}$—CH=CH—$C_7H_{14}$COOH) is difficulty soluble but reacts with substantially all of a 1 percent by weight content of chlorine in 15 minutes or less.

Typical of the bond moments given in the literature for various groups are the following:

| ⊕→⊖ | Debyes | ⊕→⊖ | Debyes | ⊕→⊖ | Debyes |
|---|---|---|---|---|---|
| H—N | 1.5 | C—Cl | 1.7 | N→O | 1.9 |
| H—O | 1.6 | C—Br | 1.6 | C=S | 3.0 |
| C—O | 0.9 |  | 0.9 | —C≡N | 3.3 |
| C=O | 2.5 | (Carboxyl) | | —N≡C | 3.0 |
| C—F | 1.5 | N=O | 1.9 | —NO₂ | 3.8 |
| CF₃ | *~2 | | |  | 3.0 |

*Estimated.

In symmetrically substituted compounds (tetracyanoethylene, for example) the effects of the individual functional groups tend to cancel out.

Some unsaturates, such as isobutylene, readily react with chlorine but do not give stable adducts, i.e., HCl and chlorosubstituted olefins form. However, the starting unsaturates do adduct with HCl. Accordingly, such unsaturates are preferably used in amounts which provide at least two reactive multiple bonds per molecule of chlorine to be removed.

Preferred unsaturates are gaseous and liquid mono- and di-olefinic hydrocarbons. Among these, propylene and ethylene, particularly the latter, are highly preferred. Propylene and ethylene are cheap, readily available, easily handled and react rapidly. Both give volatile products which, in the amounts involved, are inoffensive as fumigant components.

Ethylene is particularly convenient because it has sufficient vapor pressure to be self pressurizing for introduction to sulfuryl fluoride in cylinders or similarly closed containers.

Liquid and solid unsaturates are less economical and convenient to use and may give products which are insoluble in $SO_2F_2$. The amounts of such products present will generally not be large and, if soluble, they will be discharged with the sulfuryl fluoride (which vaporizes only as it is throttled out of a cylinder or other container). Insoluble or highly toxic products will generally have to be removed, as by filtration under pressure or distillation, if the $SO_2F_2$ is to be used as a fumigant.

As a general rule, unsaturates which are soluble in dichloromethane will also be soluble in sulfuryl fluoride. In any event, a direct solubility check is readily made.

It is not necessary that the unsaturate employed be inert, other than providing a chlorine reactive multiple bond. It is only necessary that the unsaturate be otherwise not detrimentally reactive with the chlorine-contaminated sulfuryl fluoride. That is, the usefulness of the unsaturate for chlorine conversion is not ruled out by any reactions in addition to chlorine adduction which may occur, so long as no products detrimental to the contemplated use of the sulfuryl fluoride and inseparable therefrom are formed.

WATER CONTENT

The sulfuryl fluoride may or may not be anhydrous but preferably does not contain more than about 25 ppm of water. Commercial grade $SO_2F_2$ is dried and ordinarily will not contain more than residual amounts of water. Similarly, the unsaturate does not have to be anhydrous, but preferably is. When a slow reacting unsaturate is to be used, care should be taken to ensure that moisture is not introduced with it to such an extent that appreciable chlorine hydrolysis can occur before the chlorine is deactivated by adduction.

MANNER OF CONTACTING

The sulfuryl fluoride and the unsaturate may be contacted together in any convenient manner. Treatment is most efficient when the sulfuryl fluoride is in the liquid phase. In this case, the unsaturate is introduced under an appropriate pressure, as a gas, as a liquid or as a solution or dispersion in a relatively small amount of chlorine-free sulfuryl fluoride. Most conveniently, the unsaturate is introduced, in the requisite proportion, to a flowing plant stream of liquid or gaseous sulfuryl fluoride. Introduction to a cylinder is readily accomplished by pressuring in the unsaturate, as under its own vapor pressure or with nitrogen, through the downcomer tube.

DURATION OF CONTACT

Contact is maintained at least until the chlorine content of the sulfuryl fluoride has been reduced to the desired level. Ordinarily, it will be desired to remove the chlorine as completely as possible or at least to a level at which the reaction rate becomes very low. The extent of the reaction can be checked after a period of contact by exposing moist KI paper to vapors of the sulfuryl fluoride being treated. When essentially no coloration results, the content of oxidants will be correspondingly low. The contact time required to reach such an end point will of course depend on the temperature and on the concentration and reactivity of the unsaturate employed. With the preferred types of unsaturates, reaction is very rapid, even at room temperature.

TEMPERATURE

The reaction will proceed at a useful rate with most unsaturates at any temperature at which they are soluble or dispersible in $SO_2F_2$. Any temperature less than the decomposition temperature of the unsaturate or of the chlorine adduct may be employed. However, the operating pressures required at such extreme temperatures are considerable and no practical advantage is obtained. Temperatures of from about 20° to 100°C. are generally preferable.

Amount of unsaturate used

An amount of unsaturate is used such as to provide at least one molecular proportion of reactive

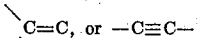

for each molecular proportion of chlorine to be removed. When the nature of the unsaturate is such that HCl formation results from the reaction with chlorine, at least one more proportion of the reactive unsaturation should be introduced to take up the HCl as formed. For example, to treat a quantity of sulfuryl fluoride containing 0.1 mole of chlorine, at least 0.1 mole of a mono olefinic compound such as propylene would be required to effect complete chlorine removal. If a compound having two double bonds is used, the minimum amount required will depend on whether both groups are reactive. For example, if one C=C is alpha, beta to a carboxyl group, whereas the other C=C is free from any substantial deactivating effect, only the latter group will be chlorine reactive. In this event, the amount of the compound required will be at least 1 mole per mole of chlorine to be removed, even though it contains two double bonds.

In any case, the minimum amount of a given unsaturate required to effect a desired degree of chlorine removal is readily determined by the type of test employed in Example 2 herein.

Pressure

Depending on the state of the sulfuryl chloride, the process of the invention can be carried out at atmospheric, subatmospheric or super-atmospheric pressures. Generally, the sulfuryl fluoride will be confined as a liquid and will be contacted with the unsaturate under at least autogenous pressure.

Examples

Example 1: Treatment of Chlorine-Contaminated $SO_2F_2$ in Cylinders

When cylinders (125 lb. each) of $SO_2F_2$ —later found to contain about 1,300 ppm of molecular chlorine — were used for space fumigation in a highly humid area, severe corrosion of metals occurred. The contaminated cylinders were then treated with propylene in the following manner. A small bomb, on a scale, was charged with about 3 lb. of liquid propylene. Nitrogen was then used to pressure (approx. 400–450 psig) the liquid propylene into the $SO_2F_2$ cylinder through the downcomer tube until about 0.5 lb. of propylene was added. The downcomer tube was cleared of propylene with nitrogen until bubbling in the cylinder was audible. The discharge valve on the $SO_2F_2$ cylinder was opened and wet KI paper exposed to the exiting gas stream. If a positive test for oxidants resulted, more propylene was transferred into the cylinder and the KI test was repeated. Several hundred cylinders of $SO_2F_2$ were treated in this manner. On an average, about 0.5 lb. of propylene was used in treating each cylinder. $SO_2F_2$ originally containing about 1,300 ppm of chlorine and treated in this manner typically contains about 0.2 percent propylene dichloride and from 0 to 0.05 percent propylene. The treated $SO_2F_2$ was found to be noncorrosive when employed as a fumigant, even at very high humidity levels.

Example 2: Tests for Suitability of Various Unsaturates for Treatment of Chlorine-Contaminated $SO_2F_2$ A number of unsaturated (C=C or C≡C) compounds were tested at room temperature for chlorine removal from a typical commercial grade sulfuryl fluoride in the following manner. From 0.5 to 1.5 grams of the unsaturated compound was charged (solids were charged as solutions in $CH_2Cl_2$ and the solvent then evaporated by warming) to a steel bomb and then 50 grams of liquid $SO_2F_2$ containing about 0.5 grams molecular chlorine and approximately 25 ppm of moisture was pressured in with nitrogen. The bomb was periodically shaken and the contents tested with KI paper at about 1 minute intervals. The results follow:

TABLE I

| C=C or C≡C Compound Tested | Structure | $SO_2F_2$ Soluble | Elapsed Time at Which KI Test Was Negative for $Cl_2$ |
|---|---|---|---|
| Ethylene | C=C | Yes | 1 Minute |
| 1-butene | C=C-C-C | " | " |
| 1,3-butadiene | C=C-C=C | " | " |
| Cyclohexene | (cyclohexene structure) | " | " |
| Limonene | $CH_3$—(cyclohexene)—CH($CH_3$)C=C | " | " |
| Bicycloheptadiene | (bicycloheptadiene structure) | " | " |
| Linalool | C\C(C)=C-C-C-C(OH)(C)-C=C | " | " |
| Citronellol | C=C-C-C-C-C-C-OH, with C branches — Mixed Isomers | " | " |
| Allyl alcohol | C=C-C=OH | " | " |
| Styrene | (phenyl)-C=C | " | 10 Min. |
| Vinyl toluene | $CH_3$-(phenyl)-C=C 60:40 meta/para mixture | " | 30 Min. |
| Allyl chloride | C=C-C-Cl | " | 30 Min. |
| Allyl bromide | C=C-C-Br | " | " |
| Diallyl amine | (C=C-C)$_2$NH | " | 15 Min. |
| Vinyl propionate | C=C-O-C(=O)-C-C | " | 10 Min. |
| Linoleic acid | $C_5H_{11}$-C=C-C-C=C-$C_2H_{14}$-COOH | " | 5 Min. |
| Oleic acid | $C_8H_{17}$-C=C-$C_7H_{14}$-COOH | Difficulty Soluble | 15 Min. |
| Bicyclo-2,2,1-hept-5-ene-2-carboxylic acid | (bicycloheptene)-COOH | Yes | 5 Minutes |
| Propargyl alcohol | C≡C-C-OH | " | 30 Min. |

TABLE I (Continued)

| C=C or C≡C Compound Tested | Structure | $SO_2F_2$ Soluble | Elapsed Time at Which KI Test Was Negative for $Cl_2$ |
|---|---|---|---|
| Vinyl chloride | C=C-Cl | " | 60 Min. |
| Fumaric acid / Maleic | HOOC-C=C-COOH | Not Soluble | No |
| Maleic anhydride | O=C-C=C-C=O with -O- bridge | " | " |
| Acrylonitrile | C=C-CN | Soluble | No |
| Crotonic acid | C-C=C-COOH | " | " |
| Acetylene dicarboxylic acid | HOOC-C≡C-COOH | Not Soluble | " |

Other unsaturated compounds suitable for the practice of the instant invention are isobutylene, citronellal, crotonyl alcohol, 3-butene 1-carboxylic acid, 2-butyne-1,4-diol, 1,2-dihydro furan, diallyl ether, divinyl ether, acetylene, 3-methyl-1-pentyne-3-ol, tetracyano ethylene, vinyl bromide, acetyl ketene and betacarotene.

We claim:
1. A method for converting molecular chlorine contained in sulfuryl fluoride to innocuous or readily separable chlorine compounds, comprising
    contacting chlorine-contaminated sulfuryl fluoride with at least one unsaturated compound having at least one carbon-to-carbon double or triple bond which is not sterically hindered or deactivated to chlorine adduction by other moieties within said unsaturated compound, the amount of said unsaturated compound contacted being such as to provide at least one reactive multiple bond per molecule of chlorine to be converted.
2. The method of claim 1 in which the unsaturated compound is a gaseous or liquid mono- or diolefinic hydrocarbon.
3. The method of claim 2 in which the olefinic hydrocarbon is ethylene or propylene.
4. The method of claim 1 in which said unsaturate is contacted in a finely divided state with a stream of chlorine-contaminated sulfuryl fluoride in a conduit.
5. The method of claim 1 in which said unsaturate is soluble in liquid sulfuryl fluoride and is pressured into a body of chlorine-contaminated, liquid sulfuryl fluoride contained in a cylinder.

* * * * *